Figure 1:
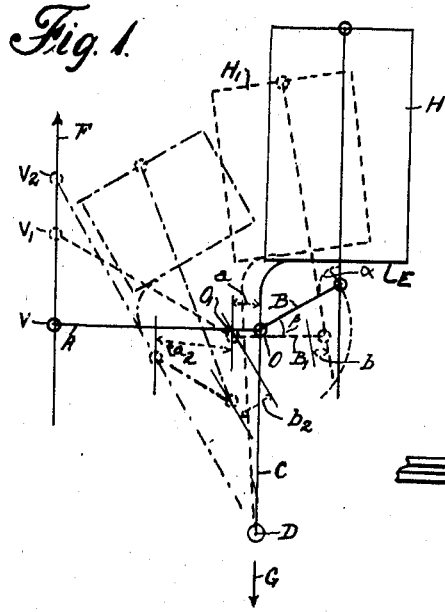

June 29, 1943.  B. MARTINS  2,323,065
SPRING SHACKLE DEVICE
Filed Dec. 9, 1940  2 Sheets-Sheet 1

Inventor
Borge Martins
By Harness Dickey & Pierce
Attorneys

June 29, 1943.　　　　B. MARTINS　　　　2,323,065
SPRING SHACKLE DEVICE
Filed Dec. 9, 1940　　　　2 Sheets-Sheet 2
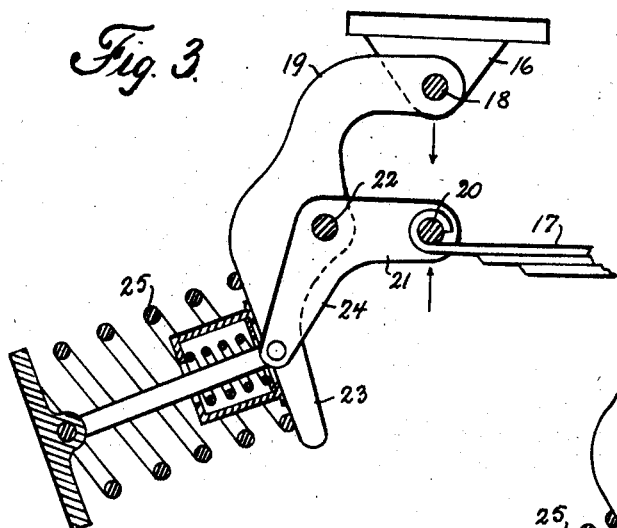
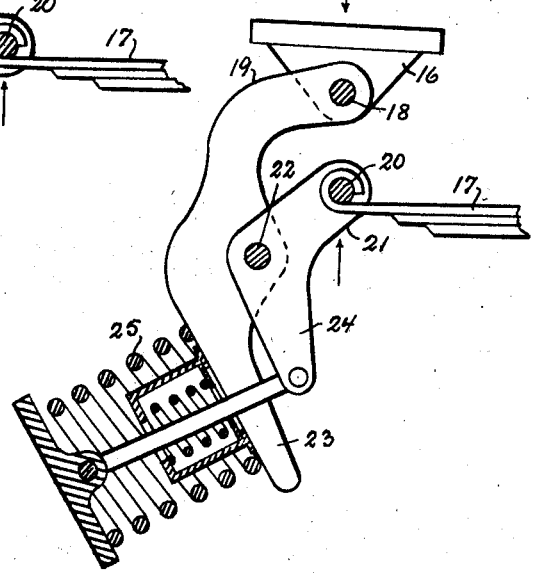
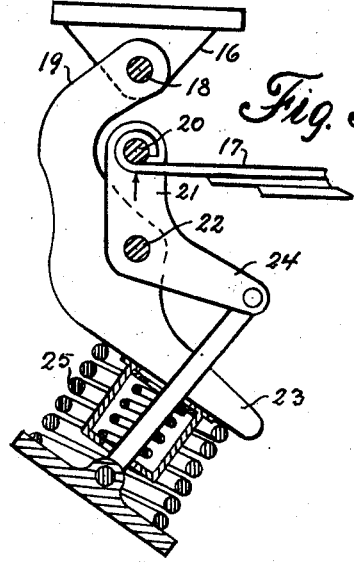
Inventor
Borge Martins
By Harness Dickey & Pierce
Attorneys Patented June 29, 1943

2,323,065

UNITED STATES PATENT OFFICE 2,323,065

SPRING SHACKLE DEVICE

Børge Martins, Frederiksberg, Denmark; vested in the Alien Property Custodian

Application December 9, 1940, Serial No. 369,283
In Denmark December 8, 1939

2 Claims. (Cl. 267—17)

(Granted under the provisions of sec. 14, act of March 2, 1927; 357 O. G. 5)

The present invention relates to an improved spring shackle device preferably for employment in connection with motor vehicles and the like, and which comprises a system of levers and an auxiliary spring, interposed between the chassis of the vehicle and the vehicle springs.

The hitherto known spring shackle devices of this kind are subjected to various drawbacks to the effect that they do not fulfill the requirements that may be put to such devices. These drawbacks are mainly due to the fact that the moment arm of force of the vehicle spring when this is actuated decreases too rapidly, and the result is that when the moment arm is too small the auxiliary becomes stiff at a very early moment during the actuation, so that the spring system is only able to absorb very small vertical movements in the wheels, and more extensive movements of the wheels are transmitted to the chassis. It has been proposed to remedy this drawback by increasing the moment arm, but such an increase necessitates the employment of a comparatively long auxiliary spring, which certainly provides an improved resiliency in the vehicle, but increases the dimensions of the device and incurs difficulties in application thereof, as likewise the costs in manufacture are considerably augmented.

When the brakes are applied to a motor vehicle in motion, the elliptic springs are subjected to a vertical torsion in relation to their point of attachment to the wheel shaft. This torsion depresses the front end of the elliptic spring, which is attached to the chassis by means of an ordinary shackle link, while the rear end of the elliptic spring that is attached to the chassis by means of a spring shackle, is somewhat elevated. This torsion is counteracted in spring shackles of known construction by a rapid decrease of the moment arm of force applied to the vehicle spring, thus causing a rapid stiffening of the auxiliary spring, unless this spring has a considerable length. A short rapidly stiffening auxiliary spring will only absorb a comparatively small portion of the brake actuation on the elliptic spring.

The object of the present invention is to provide means for constructing a spring shackle in which the above mentioned drawbacks are eliminated, and the invention is characterized by two levers, one connected pivotally to the chassis and the other to the vehicle spring, being intermediately interconnected by means of a fulcrum pin disposed in a plane through the pivotal connection of the vehicle spring at a right angle to the direction of the load actuation, and between which levers there is interposed an auxiliary spring so disposed that the angle between the longitudinal axis of the auxiliary spring and the longitudinal axis of the arm actuating the auxiliary spring has, when the device is inactive, such a size that the moment arms of force of the vehicle spring and the auxiliary spring are balanced by the weight of the chassis, from which position the moment arm of force of the vehicle spring throughout the effective range of movement of the levers in relation to each other decreases as the load increases, while the moment arm of force of the auxiliary spring increases until it reaches a maximum value adjusted to register with a predetermined load, and thereafter increases during the progressive checking of the auxiliary spring. The invention is furthermore characterized by the auxiliary spring being interposed between an abutment surface on the lever connected to the chassis and an abutment plate connected by means of a plunger rod to the other lever, and which plunger rod is so disposed that its longitudinal axis in elongation is a chord to a circle described through the point of connection of the plunger rod to the lever, with the fulcrum pin interconnecting the two levers as centre.

Another characteristic feature of the invention is that the points of suspension of the levers and their point of interconnection are so disposed relatively that at maximum load the levers are moved to carry these points in or approximately in alignment with each other, to the effect that the load is gradually transferred from the auxiliary spring to the said point of interconnection of the levers.

Finally the invention is characterized by the arrangement within the device of a rebound spring.

With a spring shackle of this construction there is obtained an improved utilization of the auxiliary spring as compared with spring shackles of hitherto known construction, and it is possible to absorb considerable greater movements in the wheels and the chassis than hitherto, resulting in a better resiliency of an empty or lightly loaded vehicle. Likewise there may be employed a short auxiliary spring so that the application of the spring shackle to the vehicle does not offer any difficulties, irrespective of the construction of the vehicle in question.

Another advantage obtained by means of the spring shackle according to the invention is that when the brakes are applied to a vehicle in motion, the upwardly directed pressure to which the rear part of the elliptic spring is subjected is fully absorbed by the auxiliary spring, owing to the fact that the points of suspension of the spring shackle are moved either towards or away from each other during an increase of the moment arm of force of the auxiliary spring simultaneously with a decrease of the moment arm of force of the vehicle spring, while the downwardly directed pressure to which the front end of the elliptic spring is subjected remains unaltered, and thereby applying to the chassis a downwardly directed unaffected wheel pressure to the road, which results in a considerable increase of the braking effect.

Figure 2:
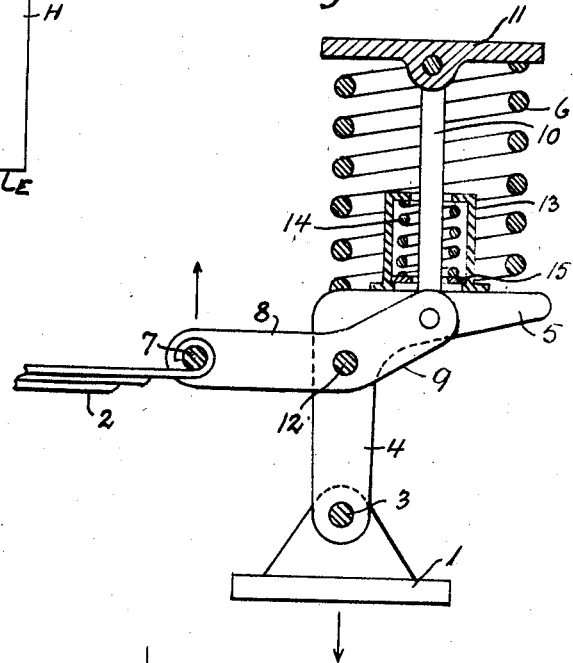
Figure 6:
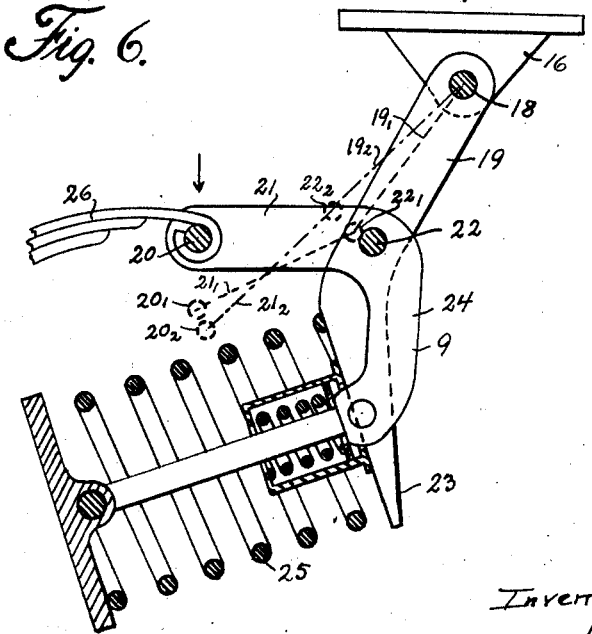

The invention is explained and illustrated in three different manners of construction in the accompanying drawings, in which Fig. 1 is a diagrammatic illustration of a spring shackle according to the invention during its activity, Fig. 2 one manner of constructing a spring shackle according to the invention, and which reads directly on the diagram in Fig. 1, Figs. 3, 4 and 5 a modified manner of construction in three different positions, and Fig. 6 a third modification of the spring shackle.

Referring to the diagram shown in Fig. 1, the full lines indicate the members of a spring shackle according to the invention in its inactive position, A indicating an arm of a lever pivoted to the vehicle spring V, and B indicating the other arm of the lever attached to the upper end of an auxiliary spring H. C indicates the one arm of a second lever pivoted to the chassis D, and E indicates the other arm of this lever, which serves as a seat for the lower end of the auxiliary spring H. The two levers are pivotally interconnected at O. The arrow G indicates the direction of load actuation on the chassis, while the arrow F indicates the direction of load actuation on the vehicle spring V. In the position shown with full lines A corresponds to the greatest moment arm of force of the vehicle spring V, this arm being disposed at a right angle to the directions of load actuation indicated by the arrows F and G. B corresponds to the moment arm of force of the auxiliary spring H, and the angle $\alpha$ between the longitudinal axis of the arm B and the longitudinal axis (the direction of load actuation) of the auxiliary spring is so adapted when the system is inactive that the moment arms A and B are balanced, and when the auxiliary spring is compressed the moment arm B will be subjected to an increase and thereafter to a decrease. From the diagram it will be noted that in elongation the longitudinal axis of the auxiliary spring is a chord to a circle having its centre in O and with B as a radius.

Assuming there is applied to the vehicle while at rest an actuation, for instance from the wheel, the vehicle spring indicated by V will be elevated, thereby revolving the lever AB on the pivot O, and when the moment arm of force of the auxiliary spring during this motion is greatest, the lever AB will be in the position indicated by dotted lines, and in which position the designations of the various members of the spring shackle device are indicated by the addition of 1. During this movement it will be noted that the moment arm of the vehicle spring is reduced by the distance $a$, while at the same time the moment arm of the auxiliary spring is increased by the distance $b$. The angle $\beta$ indicating the rotational motion of the arm B until the moment arm has reached its highest value, is determined by the angle $\alpha$, and any variation in this angle will vary the angle $\beta$ in the same direction. Thus, an actuation incurred by an increased load, from the inactive position until the moment arm of force of the auxiliary spring has acquired its greatest value, will be fully absorbed by the auxiliary spring in the same manner as if the spring were directly interposed between the chassis and the vehicle spring without the introduction of levers.

A further increase of the load on the chassis will cause the lever AB to continue its rotational motion from the position indicated by dotted lines, during a continued decrease of the moment arm of force of the vehicle spring and an incipient decrease of the moment arm of force of the auxiliary spring, until the device reaches its maximum position indicated by dot-and-dash lines, in which position the decrease of the moment arm of force of the vehicle spring is indicated by $a_2$, and the decrease of the moment arm of force of the auxiliary spring is indicated by $b_2$. To avoid confusion the designations are not applied to the various members of the device in the maximum position. During this last movement the auxiliary spring is subjected to an increasing stiffness, or it may be said the spring is progressively checked, and the load is gradually transferred from the auxiliary spring to the point of interconnection O. The auxiliary spring is thus gradually turned out of action, and the spring shackle acts as a suspension shackle between the chassis and the vehicle spring. It is to be remarked that practically the members of the device will never fully reach the theoretical maximum position indicated by dot-and-dash lines, but the result obtained will be approximately the same as described.

The diagram in Fig. 1 shows only the movement of the vehicle spring as imparted by an actuation from the wheel, but an actuation imparted to the vehicle by an increased load on the chassis in the direction indicated by the arrow E, and the relative movements of the various members of the device, will be the same as shown in the diagram.

In the instance described the points of suspension of the levers to the chassis and the vehicle spring are separated during actuation because the point of attachment of the vehicle spring is above the point of attachment to the chassis. In cases where the spring shackle is attached to the chassis at a point above the vehicle spring, the said points will approach each other during actuation.

A practical manner of construction of a spring shackle according to the invention is illustrated in Fig. 2, in which 1 indicates a part of a chassis, and 2 indicates the rear end of an elliptic spring. By means of a pivot pin 3 the one arm 4 of an angularly bent lever is attached to the chaassis, and the other arm 5 of the lever serves as abutment for an auxiliary spring 6. By means of a pivot pin 7 the one arm 8 of another lever is attached to the end of the elliptic spring 2, and the other arm 9 of this lever is pivotally connected to the one end of a plunger rod 10, which on its opposite end carries an abutment plate 11. Between this plate 11 and the lever arm 5 the auxiliary spring 6 is interposed. The two levers 4, 5 and 8, 9 are interconnected by means of a fulcrum pin 12.

With reference to the operation indicated by the diagram in Fig. 1, the pivot pin 7 and the fulcrum pin 12 when the device is inactive lie in a plane at a right angle to the direction of the load, indicated by the arrows. The operation of the spring shackle may be read directly from the diagram in Fig. 1.

Around the plunger rod 10 there is arranged a housing 13 rigidly attached to the lever arm 5, and within this housing there is disposed a rebound spring 14 inserted between the upper end of the housing and an abutment disc 15, both of which are apertured for the plunger rod 10. When inactive the free end of the arm 9 is spaced from the disc 15, but engages it during rebound movement of the spring 2 to snub such rebound. The spring 14 serves to absorb possible rebound shocks to which the device may be subjected.

Fig. 3 shows a modification of the spring shackle according to the invention. In this construction the point of attachment of the device to the chassis lies above its point of attachment to the vehicle spring. 16 indicates the chassis or a part thereof, and 17 indicates the rear end of an elliptic spring. By means of a pivot pin 18 the one end of a lever arm 19 is pivotally attached to the chassis, and by means of another pivot pin 20 the end of a lever arm 21 is connected to the elliptic spring 17. The two levers are interconnected by means of a fulcrum pin 22. Between the other arms 23 and 24 respectively of the said levers there is inserted an auxiliary spring 25 in the same manner as described in connection with Fig. 2, as likewise the device is provided with a similarly constructed and arranged rebound spring. The spring shackle is shown in its inactive position, and when the device is subjected to an actuation from either the chassis or the wheel, the pivots 18 and 20 are moved towards each other and at the same time the auxiliary spring 25 is compressed upon the relative displacement of the levers 19, 23 and 21, 24 on their fulcrum pin 22.

Referring to the manner of operation indicated by the diagram in Fig. 1, it will be understood that when the moment arm of force of the auxiliary spring is greatest, the members of the shackle device will take up the position shown in Fig. 4, during which movement the auxiliary spring has absorbed the pressure from the load. An increase of this load will cause the pivots to be moved still closer towards each other, until they reach their relative maximum position as shown in Fig. 5, from which it will be evident that the pressure of the load has gradually been transferred to the fulcrum pin 22, during a progressive checking of the auxiliary spring, which has gradually been turned out of action.

The manner of construction of a spring shackle device as illustrated in Fig. 6 is intended for employment in connection with a cantilever spring, indicated by 26. Otherwise the construction differs only from that shown in Fig. 3 by variations in the shape of the different members. Accordingly like parts are enumerated by like numbers in these two figures. The operation of the device is the same in both instances as regards the action of the auxiliary spring, and the dotted lines $19_1$, $21_1$ and $22_1$ indicate diagrammatically the relative positions of the lever arms 19 and 21, and the fulcrum pin 22, when the moment arm of force of the auxiliary spring has reached its highest value, while the dot-and-dash lines $19_2$, $21_2$ and $22_2$ indicate the maximum position of the members 19, 21 and 22, in which the auxiliary spring is turned out of action, and the device acts as suspension shackle between the chassis and the cantilever spring. This device is likewise provided with a rebound spring constructed and arranged in the same manner as shown and described in connection with Fig. 2.

I declare that what I claim is:

1. A spring shackle device for the suspension of a vehicle spring to the chassis of a vehicle, comprising a lever, means for pivotally connecting this lever to the chassis, a second lever, a pivot pin connecting this second lever to the vehicle spring, a fulcrum pin intermediately interconnecting the said two levers at a point disposed in a plane through the said pivot pin at a right angle to the direction of load actuation, a plunger rod, means for piovtally attaching the one end of the plunger rod to the free end of the said second lever, an abutment plate attached to the other end of the plunger rod, an auxiliary spring interposed between the said abutment plate and an abutment surface on the free arm of the first mentioned lever, in such a position that when inactive the longitudinal axis of the plunger rod in elongation forms a chord to a circle described through the point of interconnection between the plunger rod and the second lever, with the fulcrum pin of the two levers as centre.

2. A spring shackle device for the suspension of a vehicle spring to the chassis of a vehicle as claimed in claim 2, comprising a housing attached to the free end of the said second lever and encircling the plunger rod, a compression spring inserted within the housing around the plunger rod, a disk inserted between the lower end of the spring and the base of the housing and apertured for the plunger rod, and a portion on the disc for abutment with the end of the said second lever.

BØRGE MARTINS.